(12) United States Patent
Powell

(10) Patent No.: US 8,544,907 B2
(45) Date of Patent: Oct. 1, 2013

(54) EXTENDABLE PET SANITATION DEVICE

(76) Inventor: Melvin Powell, Roselle Park, NJ (US)

(*) Notice: Subject to any disclaimer, the term of this patent is extended or adjusted under 35 U.S.C. 154(b) by 0 days.

(21) Appl. No.: 13/635,681

(22) PCT Filed: Mar. 1, 2011

(86) PCT No.: PCT/US2011/026696
§ 371 (c)(1),
(2), (4) Date: Sep. 17, 2012

(87) PCT Pub. No.: WO2011/142873
PCT Pub. Date: Nov. 17, 2011

(65) Prior Publication Data
US 2013/0009412 A1    Jan. 10, 2013

Related U.S. Application Data

(60) Provisional application No. 61/344,037, filed on May 11, 2010.

(51) Int. Cl.
*A01K 29/00* (2006.01)

(52) U.S. Cl.
USPC ........................................................ 294/1.5

(58) Field of Classification Search
USPC .................. 294/1.3–1.5, 209, 210; 119/161, 119/867; 43/8, 11–12; 383/109, 111, 117
See application file for complete search history.

(56) References Cited

U.S. PATENT DOCUMENTS

| | | | |
|---|---|---|---|
| 2,062,023 A | 11/1936 | Gosselin | |
| 3,942,832 A | 3/1976 | Haas, Jr. | |
| 4,205,869 A * | 6/1980 | Mathis | 294/1.3 |
| D263,512 S | 3/1982 | Kawada | |
| 4,852,924 A * | 8/1989 | Ines | 294/1.5 |
| 5,342,513 A * | 8/1994 | Wall et al. | 210/238 |
| 5,442,875 A | 8/1995 | Brundage et al. | |
| 5,634,678 A | 6/1997 | Bailey | |
| 5,683,129 A | 11/1997 | Jensen | |
| 5,858,221 A * | 1/1999 | Conrad | 210/471 |
| 6,386,606 B1 | 5/2002 | Marshall | |
| 6,485,073 B2 | 11/2002 | Harrison | |
| 6,702,349 B2 | 3/2004 | Clements | |
| 7,337,577 B1 * | 3/2008 | Ramirez | 43/17 |
| D587,412 S | 2/2009 | Oka | |
| 7,934,337 B1 * | 5/2011 | Lambert | 43/12 |
| 2002/0096895 A1 | 7/2002 | McCarthy | |
| 2003/0155783 A1 | 8/2003 | Hsu | |
| 2004/0201232 A1 | 10/2004 | Borman | |
| 2006/0232083 A1 | 10/2006 | Kamenkovich | |
| 2009/0102211 A1 | 4/2009 | Antar | |
| 2009/0152884 A1 | 6/2009 | Ruscil et al. | |
| 2009/0293337 A1 * | 12/2009 | Arita et al. | 43/8 |

FOREIGN PATENT DOCUMENTS

| | | |
|---|---|---|
| EP | 1029449 | 8/2000 |
| JP | 05-276848 | 10/1993 |
| JP | 07-046945 | 2/1995 |
| JP | 2003-088267 | 3/2003 |

(Continued)

*Primary Examiner* — Stephen Vu
(74) *Attorney, Agent, or Firm* — Richard C. Litman

(57) ABSTRACT

The extendable, pet sanitation device is a portable device for collecting pet waste, especially from dogs, and includes an ergonomically-contoured shaft having a handle disposed at an upper end and a circular or oval hoop defining a lower end. A net is attached to the hoop and depends downward therefrom. Elastic straps are strategically positioned on the net for securing a disposable bag thereto. The contoured shaft is telescopically constructed so that it can be adjusted to accommodate a person's height.

7 Claims, 3 Drawing Sheets

(56) References Cited

FOREIGN PATENT DOCUMENTS

| JP | 2004-313091 | 11/2004 |
| WO | WO 96/07317 | 3/1996 |
| WO | WO 2005/000016 | 1/2005 |

* cited by examiner

EXTENDABLE PET SANITATION DEVICE

CROSS-REFERENCE TO RELATED APPLICATION

This application is a 371 of PCT/US211/26696, filed Mar. 1, 2011, which claims the benefit of U.S. Provicional Patent Application Ser. No. 61/344,037, filed May 11, 2010.

TECHNICAL FIELD

The present invention generally relates to accessories for pets, and particularly to an extendable pet sanitation device for collecting and retaining animal excrement, particularly from dogs.

BACKGROUND ART

Walking the dog is a daily occurrence for pet owners/caretakers who reside in city or suburban areas where the animal is not allowed to run free. Many of these jurisdictions have regulations requiring the person who walks the dog to collect and dispose of any pet excrement or droppings that may occur during these outings. The ubiquitous plastic bag has conventionally been the device of choice for collecting the excrement. Heretofore, use of the plastic bag has required the person to stoop or bend and somehow collect the excrement in the bag without having the excrement directly touch the skin. This scenario assumes a degree of physical dexterity that may be difficult for the elderly or persons with limited physical abilities. A device that would efficiently allow the collection of such excrement without the odious bending and/or stooping would certainly be welcomed by dog owners/caretakers. Thus, an extendable sanitation device solving the aforementioned problems is desired.

DISCLOSURE OF THE INVENTION

The extendable pet sanitation device is a portable waste-collecting device comprising an ergonomically contoured shaft having a handle disposed at an upper end and a round or oval hoop defining a lower end. A net is attached to the hoop and depends downward therefrom. The contoured shaft is telescopically constructed so that it can be adjusted to accommodate a person's height. Since the proper way to walk your dog is on the left side, the device is designed to be most manageable if held in the right hand to accommodate your pet in his position with appropriate ease.

Accordingly, the invention presents a waste-collecting device that enables a user to efficiently catch and retain a pet's excrement without bending and/or stooping or directly touching such excrement. The invention provides for improved elements thereof in an arrangement for the purposes described that are inexpensive, dependable and fully effective in accomplishing their intended purposes.

These and other features of the present invention will become readily apparent upon further review of the following specification and drawings.

BRIEF DESCRIPTION OF THE DRAWINGS

Similar reference characters denote corresponding features consistently throughout the attached drawings.

BEST MODE FOR CARRYING OUT THE INVENTION

Figure 1:
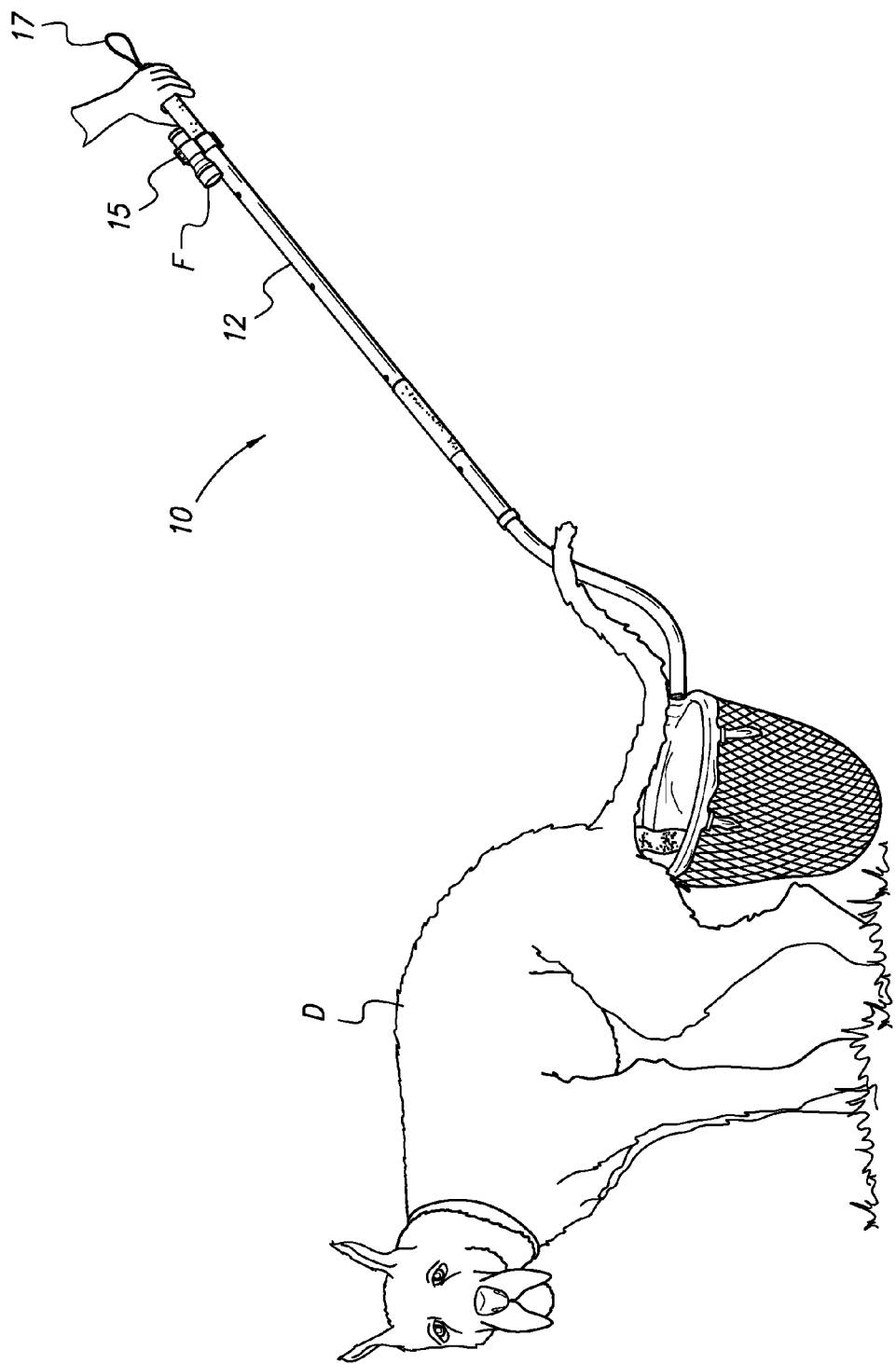
FIG. 1 is an environmental, perspective view of an extendable pet sanitation device according to the present invention.
Figure 2:
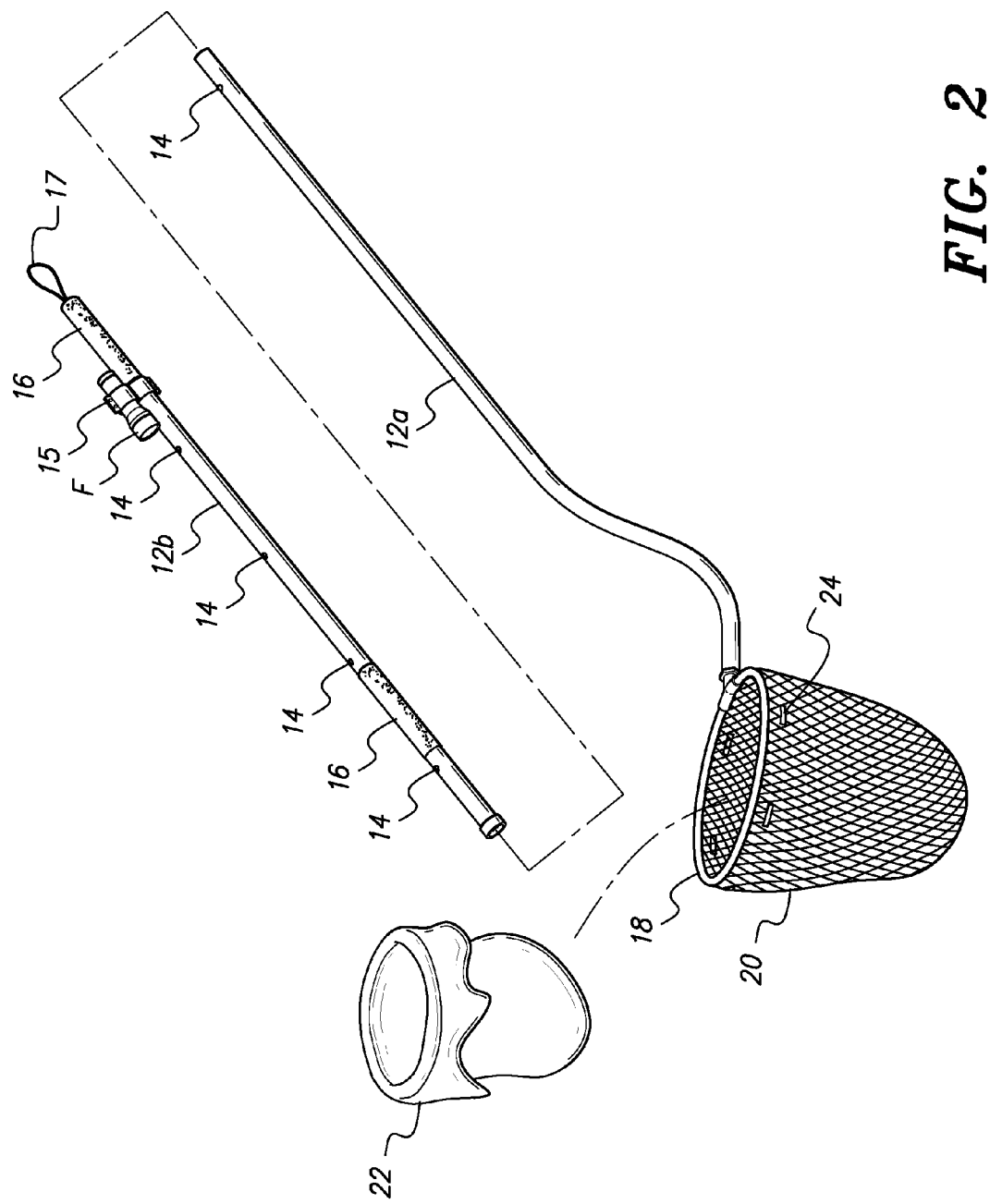
FIG. 2 is an exploded, perspective view of an extendable pet sanitation device according to the present invention.
Figure 3:
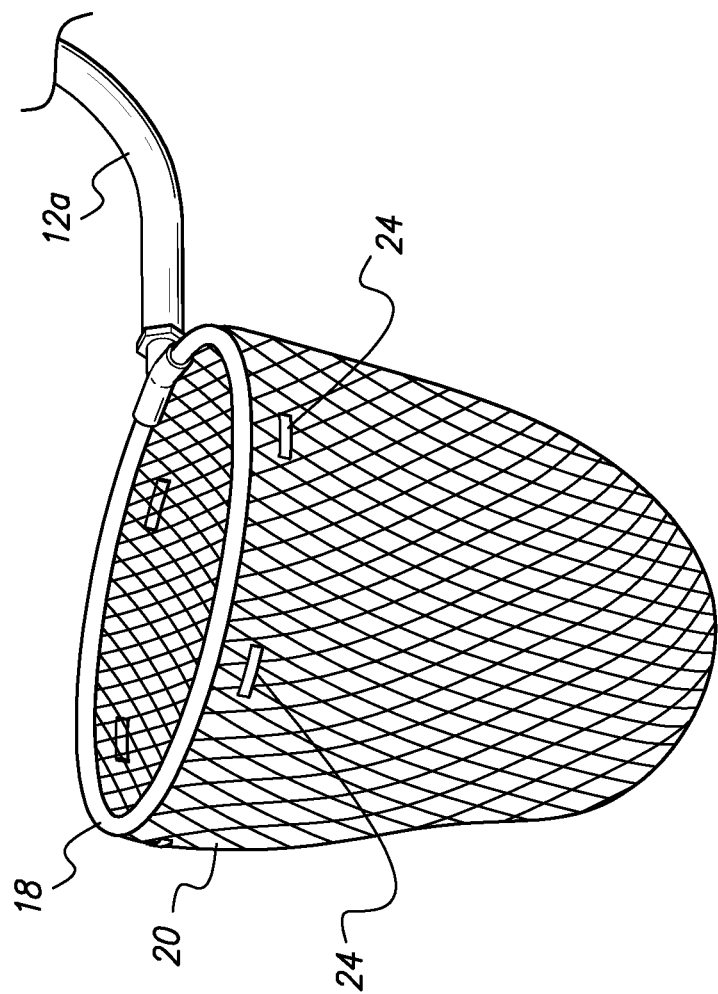
FIG. 3 is a partial perspective view of an extendable pet sanitation device according to the present invention, showing the details of the net and the straps for attaching a disposable bag thereto.

Referring to FIGS. 1-3, the extendable, pet sanitation device 10 comprises an elongate shaft 12 having at least two telescoping sections 12a and 12b. The shaft 12 is ergonomically contoured to enhance comfort for the user. Telescoping sections 12a, 12b permit the length of the shaft 12 to be adjusted to accommodate the height of the user. As presently contemplated, the adjustment range is (but not limited to) between three and four feet (0.91-1.22 meters). A conventional locking mechanism 14 is provided to lock the sections 12a, 12b in a desired position. The locking mechanism 14 may be any mechanism known in the art for temporarily and releasably locking two tubular shaft sections together, including a spring-biased pin on one shaft section that can lock into any one of a plurality of aligned holes in the other shaft section, a pin releasably inserted through aligned apertures in the two shaft sections, a twist-lock mechanism, etc.

Gripping handles 16, preferably fabricated from soft sponge, are disposed at the upper end and approximately midway of the shaft 12. It should be noted that the gripping handles 16 may be fabricated from other suitable materials (hard rubber, plastic, etc.), if desired. At its lower end, the shaft 12 terminates in a round or oval-shaped hoop 18. The hoop 18 may be fabricated from a rigid, sturdy material (metal, plastic, etc.) having a circumference of approximately nine-inches (22.9 cm). It should be noted that the 9-inch circumference is preferred, and that the hoop 18 may be constructed in smaller or larger dimensions, if warranted. A waste collection device in the form of a flexible net 20 is attached to the hoop 18 and depends therefrom. The net 20 is open at the top, adjacent its attachment to the hoop 18, and closed at its bottom. The net is approximately twelve inches (30.5 cm) in length from top to bottom to accommodate conventional trash or grocery bags. The flexible net 20 is adapted to receive a removable, disposable bag 22 (plastic, paper, etc.) therein. The bag 22 is preferably fabricated from biodegradable material. The net is designed to hold up to three bags at one time and hold the weight of numerous droppings. The lower end of the shaft adjacent hoop 18 is of an S-shaped configuration to enable the net and bags to lie flat on the ground when gathering excrement. This design enhances the gathering of such excrement and also provides accommodation for people of limited mobility, A plurality of elastic straps 24 are strategically mounted around the net adjacent the top thereof for securing the bag 22 to the net 20. This arrangement permits the net 20 to easily secure the handles of conventional trash or grocery bags thereto. A part or all of shaft 12 and the hoop 18 is coated with a phosphorescent paint designed to glow in the dark for safety purposes when walking the pet at night. The phosphorescent paint produces a continuous glow down the handle, around the hoop (through the plastic bags) that presents a perfect target for the animal's position and droppings. A mount 15 is also provided to secure a flashlight F thereto for use when walking the pet after dark. A loop 17 is attached at the upper end of shaft 12 for hanging the device when not in use.

In use, the shaft 12 is adjusted to conform to the height of the person walking the dog. A disposable bag 22 is inserted in the flexible net 20 and secured thereto via flexible straps 24. The hoop 18 and the net 20 (with inserted bag 22) are positioned on the ground or beneath the squatting animal D, as shown in FIG. 1. The bag 22, with excrement therein, is removed from the net 20 for sanitary disposal. Thus, no excrement is left, especially loose excrement, which is a sign of contamination.

It is to be understood that the present invention is not limited to the embodiments described above, but encompasses any and all embodiments within the scope of the following claims.

I claim:

1. An extendable, pet sanitation device for collecting animal excrement, comprising:
    an elongate shaft having an upper end and a lower end;
    a first gripping handle positioned on the upper end of the shaft;
    a hoop member extending from the lower end of the shaft;
    a net attached to the hoop member and depending therefrom, the net having an outer surface, an open top and a closed bottom, wherein the net further includes a plurality of elastic straps strategically mounted on the outer surface; and
    a disposable bag removably disposed in the net, wherein the bag is retained in the net by the plurality of straps.

2. The extendable, pet sanitation device according to claim 1, wherein said shaft includes telescoping sections.

3. The extendable, pet sanitation device according to claim 1, further including a second gripping handle disposed on said elongate shaft between the upper end and the lower end.

4. The extendable, pet sanitation device according to claim 1, wherein said shaft and said hoop are coated with a phosphorescent paint in order to glow in the dark.

5. The extendable, pet sanitation device according to claim 1, further including a mount for supporting a flashlight on said shaft.

6. The extendable, pet sanitation device according to claim 1, further including a loop disposed at the upper end of said shaft.

7. The extendable, pet sanitation device according to claim 1, wherein the lower end of the shaft terminates in an S-shaped configuration.

* * * * *